(12) United States Patent
Ueda et al.

(10) Patent No.: US 9,345,100 B2
(45) Date of Patent: May 17, 2016

(54) LED POWER SUPPLY

(71) Applicant: Panasonic Intellectual Property Management Co., Ltd., Osaka (JP)

(72) Inventors: Keisuke Ueda, Osaka (JP); Nobuo Ukita, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/612,350

(22) Filed: Feb. 3, 2015

(65) Prior Publication Data

US 2015/0282263 A1    Oct. 1, 2015

(30) Foreign Application Priority Data

Mar. 28, 2014    (JP) .................................. 2014-069520

(51) Int. Cl.
*H05B 37/00*    (2006.01)
*H05B 33/08*    (2006.01)

(52) U.S. Cl.
CPC ........ *H05B 33/0881* (2013.01); *H05B 33/0815* (2013.01); *G09G 2330/12* (2013.01); *H05B 33/0875* (2013.01); *H05B 33/0893* (2013.01)

(58) Field of Classification Search
CPC ........... H05B 33/0875; H05B 33/0881; H05B 33/0893; G09G 2330/12

USPC .................................. 315/193, 248, 291, 308
See application file for complete search history.

(56) References Cited

U.S. PATENT DOCUMENTS

| 2012/0212143 A1* | 8/2012 | Esaki | H05B 33/089 315/192 |
| 2012/0212144 A1* | 8/2012 | Hayashi | H05B 33/089 315/193 |

FOREIGN PATENT DOCUMENTS

| EP | 2 525 627 A2 | 11/2012 | |
| EP | 2525627 A2 * | 11/2012 | ........... H05B 33/089 |
| JP | 2012-244737 A | 12/2012 | |

* cited by examiner

*Primary Examiner* — Minh D A
*Assistant Examiner* — Borna Alaeddini
(74) *Attorney, Agent, or Firm* — Renner, Otto, Boisselle & Sklar, LLP

(57) ABSTRACT

A no-load detection circuit includes an inductance device, an impedance device and a switch circuit. The inductance device is interposed between a choke coil and a first output terminal, which is at a high potential side, so as to be magnetically coupled to the choke coil. The impedance device is connected in series with the inductance device between the inductance device and the first output terminal. The switch circuit is configured to be turned on when a value of electric potential at the first output terminal exceeds a predetermined reference value. The control circuit is configured to stop the switching control if the switch circuit is turned on.

3 Claims, 2 Drawing Sheets

LED POWER SUPPLY

CROSS REFERENCE TO RELATED APPLICATIONS

This application claims the benefit and priority of Japanese Patent Application No. 2014-069520, filed on Mar. 28, 2014, the entire contents of which are incorporated herein by reference.

TECHNICAL FIELD

The disclosure relates generally to LED power supplies and, more particularly, to an LED power supply configured to power an LED light source as an illumination light source.

BACKGROUND ART

LED (light-emitting diode) light sources have been paid great attention as light sources taking the place of incandescent lamps, fluorescent lamps and the like in recent years. For example, JP Pub. No. 2012-244737 (hereinafter referred to as "Document 1") discloses an LED power supply for energizing LED(s) as an illumination light source.

The LED power supply described in Document 1 includes a rectifier, a ripple filter circuit, a power converter circuit and the like. The rectifier is configured to convert (full-wave rectify) an alternating current (an alternating voltage) to a direct current (a direct voltage), where the alternating current is supplied from a commercial AC power supply. The ripple filter circuit is configured to remove ripples from (smooth) a pulsating current (a pulsating voltage) as a result of full-wave rectification by the rectifier. The power converter circuit is configured to convert (step down) the direct current (the direct voltage) as a result of smooth by the ripple filter circuit into a DC current (a DC voltage) corresponding to LED(s) as a load.

The LED power supply further includes a stop control circuit and a mask circuit. The stop control circuit is configured to stop the power converter circuit when the load (LED (s)) is removed during an operation of the power converter circuit, namely in no-load condition. Specifically, the stop control circuit is configured to detect a DC current (a load current) output from the power converter circuit, and to detect presence of the no-load condition if the load current is lower than a predetermined lower limit, thereby to stop the power converter circuit.

The mask circuit is configured to prohibit the stop control circuit from operating if a value of the DC voltage smoothed by the ripple filter circuit is higher than a predetermined value, and to permit the stop control circuit to operate if the value of the DC voltage is equal to or lower than the predetermined value.

The LED power supply described in Document 1 can therefore suppress abnormal increase in an output voltage thereof in no-load condition to prevent an excessive current from flowing through the load when it is reconnected to a load.

In the LED power supply described in Document 1, there is however a problem that wrong determination (a malfunction) is liable to occur when an input voltage thereof (a power supply voltage from an AC power supply) instantaneously decreases (like momentary power failure or the like) because it detects an input voltage and an output current to judge output prohibition or permission with respect to the power converter circuit from the detection results.

SUMMARY OF THE INVENTION

The present invention has been achieved in view of the above circumstances, and an object thereof is to suppress occurrence of a malfunction when an input voltage thereof instantaneously decreases.

In an aspect of the invention, an LED power supply includes a power converter circuit (1) comprising two output terminals (103 and 104) between which a load (8) comprising an LED is detachably connected; a control circuit (2) configured to control the power converter circuit (1); and a no-load detection circuit (3) configured to detect presence of a no-load condition in which the load (8) is not connected between the output terminals (103 and 104).

The power converter circuit (1) includes a chopper converter including a switching device (10) and a choke coil (11). The control circuit (2) is configured to perform switching control of the switching device (10), and to stop the switching control if the no-load detection circuit (3) detects the presence of the no-load condition. The no-load detection circuit (3) includes an inductance device (30), an impedance device (31) and a switch circuit (32). The inductance device (30) is interposed between the choke coil (11) and the first output terminal (103), which is at a high potential side, so as to be magnetically coupled to the choke coil (11). The impedance device (31) is connected in series with the inductance device (30) between the inductance device (30) and the first output terminal (103). The switch circuit (32) is configured to be turned on when a value of electric potential at the first output terminal (103) exceeds a predetermined reference value. The control circuit (2) is configured to stop the switching control if the switch circuit (32) is turned on.

The LED power supply can suppress occurrence of a malfunction when an input voltage of the LED power supply instantaneously decreases.

BRIEF DESCRIPTION OF THE DRAWINGS

The figures depict one or more implementations in accordance with the present teaching, by way of example only, not bay way of limitations. In the figure, like reference numerals refer to the same or similar elements where.

DETAILED DESCRIPTION

Figure 1:
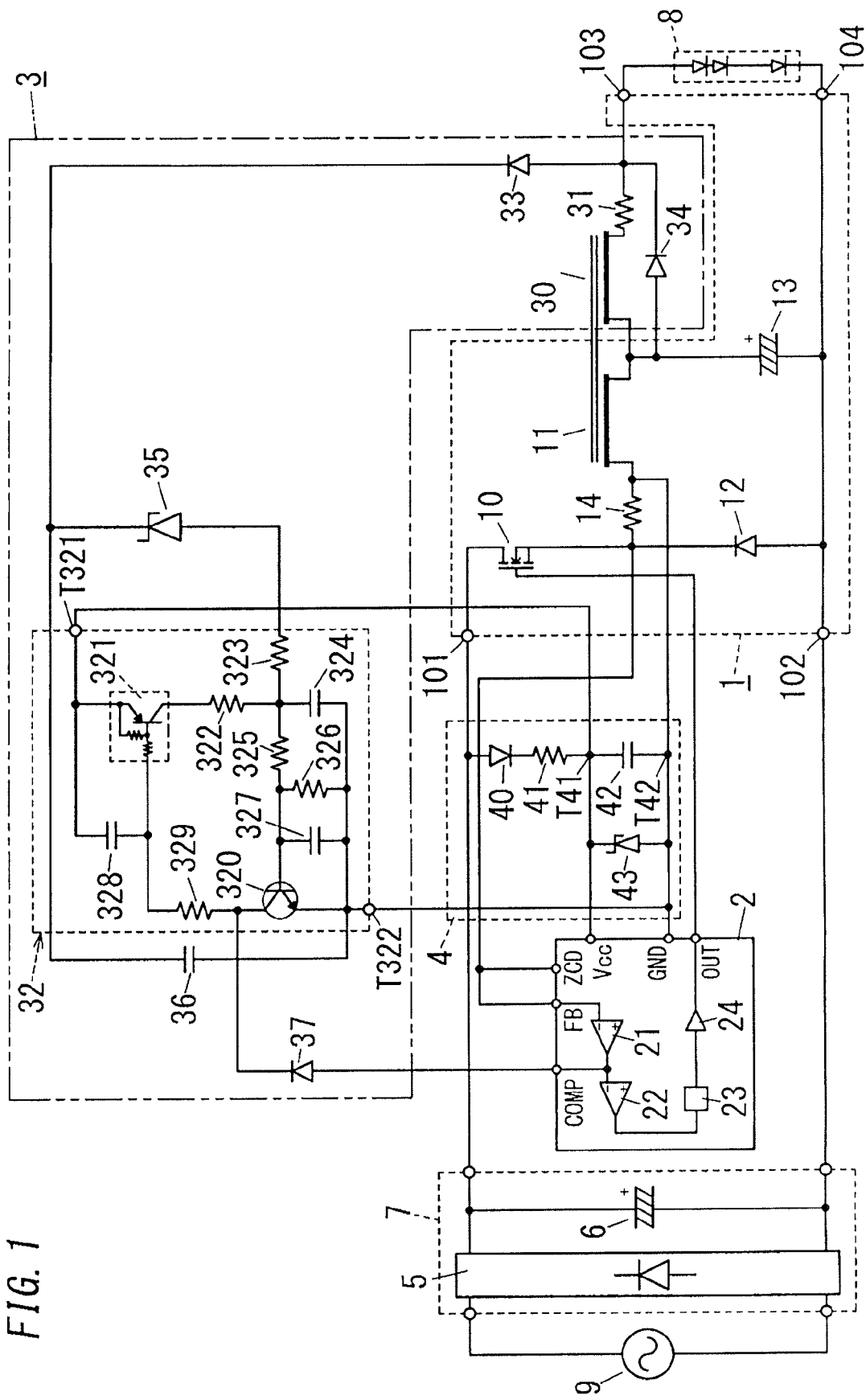
FIG. 1 is a circuit diagram of an LED power supply in accordance with an embodiment of the present invention.

As shown in FIG. 1, an LED power supply in an embodiment is provided with a power converter circuit 1 including first and second output terminals 103 and 104 between which an LED module 8 as a load is detachably connected. The LED module 8 (an LED light source) includes at least one LED (light-emitting diode). The LED power supply is also provided with a control circuit 2 configured to control the power converter circuit 1, and a no-load detection circuit 3 configured to detect presence of a no-load condition in which the LED module 8 is not connected between the first and second output terminals 103 and 104. The power converter circuit 1 is formed of a chopper converter including a switching device 10 and a choke coil 11. The control circuit 2 is configured to perform switching control of the switching device 10, and to stop the switching control if the no-load detection circuit 3 detects the presence of the no-load condition. The no-load detection circuit 3 includes an inductance device 30, an impedance device 31 and a switch circuit 32. The inductance device 30 is interposed between the choke coil 11 and the first output terminal 103, which is at a high potential side, so as to be magnetically coupled to the choke coil 11. The impedance device 31 is electrically connected in series with the inductance device 30 between the inductance device 30 and the first output terminal 103. The switch circuit 32 is configured to be turned on when a value of electric potential at the first output terminal 103 exceeds a predetermined reference value. The control circuit 2 is configured to stop the switching control if the switch circuit 32 is turned on.

In the embodiment, if a no-load condition occurs in the LED power supply, electric potential at the first output terminal 103 rises. If a value of the electric potential then exceeds the reference value, the no-load detection circuit 3 detects presence of the no-load condition and the switch circuit 32 is then turned on. The LED power supply in the embodiment can accordingly suppress occurrence of a malfunction thereof when an input voltage of the LED power supply instantaneously decreases, in comparison with the LED power supply described in Document 1 configured to detect an input voltage and an output current to judge output prohibition or permission with respect to the power converter circuit from the detection results.

In a preferable embodiment, the LED power supply may further include a control power supply circuit 4 configured to supply activation electric power to the control circuit 2. In addition, the switch circuit 32 may be configured to maintain an on-state thereof until a main electric current is equal to or smaller than a predetermined lower limit after being turned on so that the main electric current is supplied from the control power supply circuit 4.

In the embodiment, since the LED power supply is configured as described above, the switch circuit 32 can be configured easily.

In a preferable embodiment, the control circuit 2 of the LED power supply may be configured of a universal integrated circuit configured to perform the switching control of the switching device 10. The control circuit 2 may be also configured so that a signal, at a terminal (a COMP terminal) of two or more terminals with which the integrated circuit is provided, is driven high during proper operation of the integrated circuit and is driven low if the switch circuit 32 is turned on.

In the embodiment, if the LED power supply is configured as described above, it is possible to reduce manufacturing cost of the control circuit 2 and the no-load detection circuit 3.

In the example of FIG. 1, the LED module 8 as the load includes LED chips which are electrically connected in series with each other. A rated voltage of the LED module 8 has a value given by multiplying a rated value of a forward voltage of one LED chip and the number of the LED chips in series. The LED module 8 includes an anode, on a first end, electrically connected to the first output terminal 103 and a cathode, on a second end, electrically connected to the second output terminal 104 which is at a low potential side.

In a preferable embodiment, the LED power supply may include a diode bridge 5 and a capacitor (a smoothing capacitor) 6. The diode bridge 5 is configured to full-wave rectify (commutate) an AC current (an AC voltage) supplied from an AC power supply 9. The capacitor 6 is configured to remove the ripples of (smooth) a pulsating current (a pulsating voltage) as a result of full-wave rectification by the diode bridge 5. That is, the diode bridge 5 and the capacitor 6 constitute a DC power supply 7 configured to supply electric power to the power converter circuit 1. As an alternative example, the DC power supply 7 may be a storage battery.

The power converter circuit 1 is a known step-down chopper circuit (buck DC-DC converter), and includes the switching device 10, the choke coil 11 and a diode 12. In the example of FIG. 1, the power converter circuit 1 further includes first and second input terminals 101 and 102, a capacitor (a smoothing electrolytic capacitor) 13 and a resistor 14. Specifically, the electric power from the DC power supply 7 is supplied between the first and second input terminals 101 and 102. The resistor 14 is a current sensor for detecting an electric current flowing through an inductor (the choke coil 11) and interposed between the choke coil 11 and a junction of the switching device 10 and the diode 12. In addition, a junction of the resistor 14 and the choke coil 11 is electrically connected to a second power output terminal T42 to be described latter.

The switching device 10 includes a first end corresponding to the first input terminal 101, a second end electrically connected to a cathode of the diode 12, and a control end (a gate) electrically connected to the control circuit 2. For example, the switching device 10 is formed of a field-effect transistor, and includes a drain (the first end) electrically connected to a first end, which is at a high potential side, of the capacitor 6, and a source (the second end) electrically connected to the cathode of the diode 12.

An anode of the diode 12 is electrically connected to the second input terminal 102 and the second output terminal 104. In addition, the anode of the diode 12 is electrically connected to a second end (ground), which is at a low potential side, of the capacitor 6.

The choke coil 11 includes a first end electrically connected to the junction of the switching device 10 and the diode 12, and a second end electrically connected to a side of the first output terminal 103.

The capacitor 13 is connected between the second end of the choke coil 11 and the second output terminal 104 of the power converter circuit 1. That is, the capacitor 13 includes a first end electrically connected to the second end of the choke coil 11 and a second end electrically connected to the second output terminal 104 of the power converter circuit 1. The second end of the choke coil 11 is electrically connected to the first end, which is at a high potential side, of the capacitor 13.

In the preferable embodiment, the LED power supply includes the control power supply circuit 4. The control power supply circuit 4 is configured to generate activation electric power for the control circuit 2 and the switch circuit 32 from AC electric power supplied from the AC power supply 9. In the example of FIG. 1, the control power supply circuit 4 includes first and second power output terminals T41 and T42, and is configured to generate the activation electric power to supply it to the control circuit 2 and the switch circuit 32 through the terminals T41 and T42. Specifically, it is preferable that the control power supply circuit 4 include a series circuit of a diode 40, a resistor 41 and a capacitor 42, and a Zener diode 43. The diode 40 includes an anode electrically connected to the first end of the capacitor 6, and a cathode electrically connected to a first end of the resistor 41. A second end of the resistor 41 is electrically connected to a first end of the capacitor 42 and a cathode of the Zener diode 43. A second end of the capacitor 42 is electrically connected to an anode of the Zener diode 43. In this circuit example, a junction of the first end of the capacitor 42 and the cathode of the Zener diode 43 correspond to the first power output terminal T41, while a junction of the second end of the capacitor 42 and the anode of the Zener diode 43 correspond to the second power output terminal T42. The cathode of the Zener diode 43, namely the first power output terminal T41 is electrically connected to a power supply voltage input terminal (Vcc) of the control circuit 2, and the anode of the Zener diode 43, namely the second power output terminal T42 is electrically connected to a ground terminal (GND) of the control circuit (the integrated circuit) 2. In addition, the first and second power output terminals T41 and T42 are electrically connected to first and second power input terminals T321 and T322 of the switch circuit 32.

That is, the control power supply circuit 4 is configured to convert a DC voltage after the reduction of ripple by the capacitor 6 down to a constant voltage (a Zener voltage) of the Zener diode 43. In short, the Zener voltage (a reverse breakdown voltage) is set to a voltage lower than a voltage across the capacitor 6.

In the preferable embodiment, the control circuit 2 is formed of the universal integrated circuit configured to perform the switching control of the switching device 10. Suitable examples of the integrated circuit are LED lighting control ICs such as R2A20134 developed by Renesas Electronics Corporation and the like. The LED lighting control IC (e.g., R2A20134) includes an error amplifier 21 and a constant voltage source (not shown) configured to supply a reference constant voltage to a first input terminal (a non-inverting input terminal) of the error amplifier 21, and is configured to provide an output current of the error amplifier 21 to an outside through a COMP terminal thereof for phase compensation.

For example, as shown in FIG. 1, the control circuit 2 further includes a comparator 22 electrically connected to an output terminal of the error amplifier 21, a logic block 23 electrically connected to an output terminal of the comparator 22, a driver 24 which is electrically connected to an output terminal of the logic block 23 and configured to output a switching control signal through an OUT terminal of the control circuit 2, and the like. A second input terminal (an inverting input terminal) of the error amplifier 21 is electrically connected to an FB terminal of the control circuit 2. The FB terminal and a ZCD terminal of the control circuit 2 are electrically connected to the junction of the switching device 10 and the diode 12. In an example, the FB terminal is electrically connected to the junction via an impedance circuit. The ZCD terminal is electrically connected to a side of the logic block 23. For example, in critical current mode, the control circuit 2 is configured so that the switching control signal is driven high when an inductor current obtained from the ZCD terminal becomes zero. In an error amplification operation of the critical current mode, the control circuit 2 is configured so that the switching control signal is driven low when a ramp signal reaches a COMP signal, where the ramp signal is an input signal from a side of a ramp control block (not shown) to the comparator 22, and the COMP signal is an input signal from the error amplifier 21 to the comparator 22 (i.e., a signal at the COMP terminal). The COMP signal is explained in detail. In not only critical current mode but also constant frequency mode, the control circuit 2 is configured so that the switching control signal is kept low while the COMP signal is lower than the ramp signal. In the embodiment, the operation is used for the switch circuit 32. The integrated circuit forming the control circuit 2 is well-known, and accordingly detailed explanation and drawings of circuit configuration and operation thereof are omitted.

As stated above, the no-load detection circuit 3 includes the inductance device 30, the impedance device 31 and the switch circuit 32. It is preferable that the no-load detection circuit 3 further include diodes 33, 34 and 37, a Zener diode 35, and a capacitor 36.

The inductance device 30 is interposed between the choke coil 11 and the first output terminal 103. Specifically, the inductance device 30 has a first end electrically connected to the second end (an end, at a high potential side, of the capacitor 13) of the choke coil 11, and a second end electrically connected to a first end of the impedance device 31. The inductance device 30 is also magnetically coupled to the choke coil 11.

The impedance device 31 is formed of one or more resistors having a high impedance (e.g., about 100 kΩ). The impedance device 31 has the first end electrically connected to the second end of the inductance device 30, and a second end electrically connected to the first output terminal 103.

The diode 34 has an anode electrically connected to the first end of the capacitor 13, and a cathode electrically connected to the first output terminal 103. The diode 33 has an anode electrically connected to the first output terminal 103, and a cathode electrically connected to a cathode of the Zener diode 35 and a first end of the capacitor 36.

The switch circuit 32 is configured to operate by electric power from the control power supply circuit 4, and to stop the switching control of the switching device 10 by the control circuit 2 by connecting a diode 37 between the COMP terminal and the ground terminal of the control circuit 2 if a value of a voltage at the first output terminal 103 exceeds the predetermined reference value (a Zener voltage of the Zener diode 35 in the example of FIG. 1). The switching control is to be stopped until a preset time elapses after the AC power supply 9 is turned off or an output voltage of the control power supply circuit 4 is equal to or lower than a preset voltage. For example, the switch circuit 32 is formed of a first transistor 320, a second transistor 321, resistors 322, 323, 325, 326 and 329, and capacitors 324, 327 and 328.

The second transistor 321 is formed of a transistor having built-in resistors, which includes a PNP bipolar transistor, an input resistor having a first end electrically connected to a base of the bipolar transistor, and a resistor connected between the base and an emitter thereof. The second transistor 321 has an emitter as a first end (the emitter of the bipolar transistor) electrically connected to a first end of the capacitor 328 and the cathode of the Zener diode 43, a base as a control end (a second end of the input transistor) electrically connected to a second end of the capacitor 328 and a first end of the resistor 329, and a collector as a second end electrically connected to a first end of the resistor 322.

The first transistor 320 is formed of an NPN bipolar transistor. The first transistor 320 includes a collector as a first end electrically connected to a second end of the resistor 329, a base as a control end electrically connected to each first end of the capacitor 327 and the resistors 325 and 326, and an emitter as a second end electrically connected to the ground terminal of the control circuit 2 and the second power output terminal T42. That is, the resistor 326 and the capacitor 327 are connected in parallel between the base and the emitter of the first transistor 320. The base of the first transistor 320 is electrically connected to an anode of the Zener diode 35 via a series circuit of the two resistors 325 and 323.

The resistor 322 includes the first end electrically connected to the collector of the second transistor 321, and a second end electrically connected to a junction of the resistors 325 and 323. The capacitor 324 has a first end electrically connected to the second end of the resistor 322, and a second end electrically connected to the emitter of the first transistor 320. The diode 37 includes a cathode electrically connected to the collector of the first transistor 320, and an anode electrically connected to the COMP terminal of the control circuit 2.

Thus, the switch circuit 32 has a circuit configuration equivalent to a three-terminal thyristor, and is configured so that if the Zener diode 35 is reverse-biased above a reverse breakdown voltage thereof, a trigger signal is input to the switch circuit 32 and two contacts (the collector and the emitter of the first transistor 320) are then closed from an opened state. The switch circuit 32 is electrically connected in parallel with the Zener diode 43 of the control power supply circuit 4. Therefore, once turned on, the switch circuit 32 maintains its on-state until a value of a main electric current (e.g., an electric current through the capacitor 324) fed from the control power supply circuit 4 is equal to or smaller than a predetermined value. In other words, the switch circuit 32 is configured so that the two contacts are opened from a closed state if the value of the main current fed from the control power supply circuit 4 is equal to or smaller than the predetermined value.

In short, the switch circuit 32 includes the capacitor 324, a first switch device (320) and a second switch device (321). The capacitor 324 is configured to be charged through a reference value setting device (35) having the predetermined reference value when a value of electric potential at the first output terminal 103 exceeds the predetermined reference value. The first switch device (320) is configured to connect the diode 37 between the COMP terminal and the ground terminal of the control circuit 2 if it is turned on by a voltage across the capacitor 324. The second switch device (321) is configured, if the first switch device (320) is turned on, to be turned on by electric power from the control power supply circuit 4 to maintain the on-state of the first switch device (320) by supplying the electric power to the capacitor 324.

An operation of the LED power supply in the embodiment is now explained. An operation in normal condition in which the LED module 8 is connected between the first and second output terminals 103 and 104 is first explained.

In normal condition, the control circuit 2 performs the switching control of the switching device 10 of the power converter circuit 1 in critical current mode for example. The critical current mode is a control method by which after being turned off the switching device 10 is turned on again when a current (a regenerative current) flowing through the load (the LED module 8) from the choke coil 11 becomes zero. The control method in such a critical current mode is well-known and accordingly detailed explanation thereof is omitted.

In normal condition, an output current (an output voltage) of the power converter circuit 1 after reduction of ripple by the capacitor 13 is supplied to the LED module 8 via the diode 34 of the no-load detection circuit 3. When the switching device 10 is turned off, electromotive force is also induced in the inductance device 30 magnetically coupled to the choke coil 11. However, an electric current by the electromotive force induced in the inductance device 30 hardly flows through the load (the LED module 8) because the impedance device 31 having a high impedance is connected between the inductance device 30 and the first output terminal 103.

In the embodiment, the Zener voltage (the reverse breakdown voltage) of the Zener diode 35 in the no-load detection circuit 3 is set to a voltage higher than a potential difference between the first output terminal 103 and the ground terminal of the control circuit 2 (the anode of the Zener diode 35 in the example of FIG. 1) in normal condition. The Zener diode 35 is not accordingly reverse-biased above the reverse breakdown voltage in normal condition. As a result, the switch circuit 32, namely the first transistor 320 maintains off-state thereof without turning on.

An operation in no-load condition in which the LED module 8 is not connected between the first and second output terminals 103 and 104 is next explained. For example, it is assumed that the normal condition is shifted to the no-load condition after the LED module 8 during operation is removed from the first and second output terminals 103 and 104 for some reason. In the no-load condition, no load current occurs. Accordingly, a voltage across the capacitor 13 (an output voltage of the power converter circuit 1) and an induced voltage in the inductance device 30 are applied to the first output terminal 103. In the embodiment, the LED power supply has a 1:1 turns ratio between the choke coil 11 and the inductance device 30, and accordingly the induced voltage in the inductance device 30 becomes a voltage that is almost the same as the output voltage of the power converter circuit 1. As a result, the potential difference between the first output terminal 103 and the ground terminal of the control circuit 2 exceeds the Zener voltage of the Zener diode 35. That is, the Zener diode 35 is reverse-biased above the reverse breakdown voltage so as to allow an electric current to flow in the reverse direction. In other words, the Zener voltage of the Zener diode 35 in the embodiment is set to a voltage lower than a potential difference between the first output terminal 103 and the anode of the Zener diode 35 in normal condition.

Figure 2:
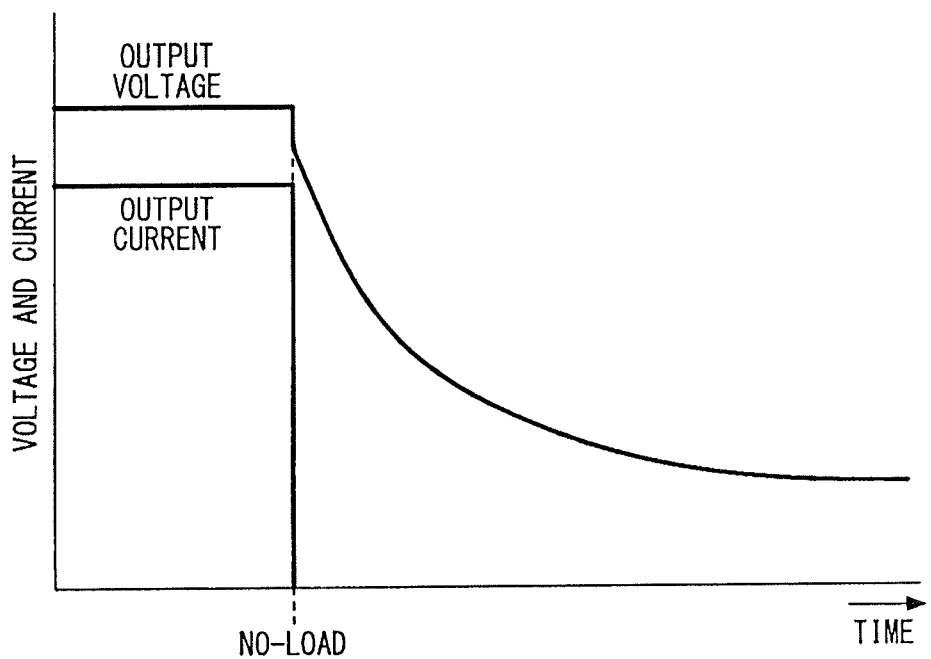
FIG. 2 is a characteristic diagram of an output voltage and an output current of the LED power supply, illustrating an operation thereof in no-load condition.

If the Zener diode 35 is reverse-biased so that an electric current flows from the first output terminal 103 to the second power input terminal T322 (GND) through the diode 33, the Zener diode 35, the resistor 323 and the capacitor 324, the switch circuit 32, namely the first transistor 320 is triggered to be turned on. Specifically, if the electric current flows as stated above, a voltage across the capacitor 324 rises and the first transistor 320 is then turned on, while a base current from the second transistor 321 flows through the first transistor 320 and the like and the second transistor 321 is turned on. If the second transistor 321 is turned on, electric power is supplied from the control power supply circuit 4 to the capacitor 324 through the second transistor 321 and the like. As a result, the on-state of the first transistor 320 is maintained. Thus, if the switch circuit 32 is turned on, a signal at the COMP terminal of the control circuit 2 becomes lower than the aforementioned ramp current. The control circuit 2 accordingly stops the switching control to deactivate the power converter circuit 1. After the switch circuit 32 is turned on, the output voltage between the first and second output terminals 103 and 104 decreases gradually (see FIG. 2). In the example of FIG. 2, the output voltage is decreased to a constant voltage by a divided voltage of an input voltage obtained through a bleeder resistor circuit (not shown) electrically connected in parallel with the capacitor 13, and the like. As state above, the switch circuit 32 can maintain the on-state while it receives a main electric current from the control power supply circuit 4 even after the control circuit 2 is stopped by the power converter circuit 1. It is accordingly possible to prevent an excessive current from flowing through the LED module 8 even if a load (an LED module 8) is connected between the first and second output terminals 103 and 104 while the AC power supply 9 supplies electric power to the DC power supply 7.

If the AC power supply 9 stops supplying the electric power to the DC power supply 7, the control power supply circuit 4 also stops outputting the main electric current. As a result, the switch circuit 32 (the first and second transistors 320 and 321) is turned off. Accordingly, if the AC power supply 9 is turned on while the LED module 8 is connected between the first and second output terminals 103 and 104, the control circuit 2 again starts switching control of the switching device 10 to power the LED module 8.

As stated above, the LED power supply described in Document 1 is configured to detect an input voltage and an output current to judge output prohibition or permission with respect to the power converter circuit from the detection results. The LED power supply accordingly has the problem that wrong determination (a malfunction) is liable to occur when the input voltage (a power supply voltage from the AC power supply) instantaneously decreases (like momentary power failure or the like). In addition, after a no-load condition, the LED power supply has a slight time lag until detecting a no-load condition after the no-load condition.

In the embodiment, when a no-load condition occurs as stated above, the output voltage at the first output terminal 103 greatly rises and the no-load detection circuit detects the no-load condition. That is, even if a power supply voltage of the AC power supply 9 instantaneously decreases, the output voltage at the first output terminal 103 does not rise. It is consequently possible to suppress occurrence of a malfunction caused by instantaneous decrease in the input voltage. It is moreover possible to reduce a time required for detection of a no-load condition by the no-load detection circuit 3 in comparison with the LED power supply described in Document 1 because the output voltage at the first output terminal 103 rises immediately after a no-load condition.

In the LED power supply of the embodiment, a time period from a time point that a no-load condition occurs to a time point that the power converter circuit 1 stops outputting the output voltage is shortened in comparison with the LED power supply described in Document 1. The LED power supply can accordingly avoid continuing to apply a voltage higher than a rated voltage across the first and second output terminals 103 and 104 in no-load condition. The LED power supply of the embodiment can therefore ensure safety.

In an embodiment, the switch circuit 32 of the no-load detection circuit 3 may be formed of a thyristor. However, the example of FIG. 1 has an advantage that a value of an on-voltage of the first transistor 320 can be set to an extremely low value by a collector-emitter voltage of the first transistor 320. The switch circuit 32 in FIG. 1 also has an advantage that a voltage required as a trigger signal can be set by resistance values of the resistors 325 and 326 and noise immunity can be improved.

In an embodiment, the switch circuit 32 may include first and second switch devices 320 and 321 other than bipolar transistors. For example, the switch circuit 32 may include field effect transistors. Alternatively, the switch circuit 32 may be formed of a microcontroller.

In an embodiment, the first end of the first switch device (the emitter of the first transistor 320) may be electrically connected to a terminal other than the COMP terminal of the control circuit 2, for example, to the output terminal thereof.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An LED power supply, comprising:
   a power converter circuit comprising first and second output terminals between which a load comprising an LED is detachably connected;
   a control circuit configured to control the power converter circuit; and
   a no-load detection circuit configured to detect presence of a no-load condition in which the load is not connected between the first and second output terminals, wherein
   the power converter circuit comprises a chopper converter comprising a switching device and a choke coil,
   the control circuit is configured to perform switching control of the switching device, and to stop the switching control if the no-load detection circuit detects the presence of the no-load condition,
   the no-load detection circuit comprises an inductance device, an impedance device and a switch circuit, the inductance device being interposed between the choke coil and the first output terminal, which is at a high potential side, so as to be magnetically coupled to the choke coil, the impedance device being connected in series with the inductance device between the inductance device and the first output terminal, the switch circuit being configured to be turned on when a value of electric potential at the first output terminal exceeds a predetermined reference value, and
   the control circuit is configured to stop the switching control if the switch circuit is turned on.

2. The LED power supply of claim 1, further comprising a control power supply circuit configured to supply activation electric power to the control circuit, wherein
   the switch circuit is configured to maintain an on-state thereof until a main current is equal to or less than a predetermined lower limit after being turned on so that the main current is supplied from the control power supply circuit.

3. The LED power supply of claim 2, wherein
   the control circuit comprises a universal integrated circuit configured to perform the switching control of the switching device, and
   the control circuit is configured so that a signal, at a terminal of two or more terminals with which the integrated circuit is provided, is driven high while the integrated circuit functions properly and driven to low when the switch circuit is turned on.

* * * * *